United States Patent
Zhurin et al.

(10) Patent No.: US 7,198,057 B2
(45) Date of Patent: Apr. 3, 2007

(54) FREEZE-FREE WATER HOSE

(75) Inventors: Viacheslav V. Zhurin, 548 Charrington Ct., Fort Collins, CO (US) 80525; Lyudmila V. Zhurin, Fort Collins, CO (US)

(73) Assignee: Viacheslav V. Zhurin, Fort Collins, CO (US)

( * ) Notice: Subject to any disclaimer, the term of this patent is extended or adjusted under 35 U.S.C. 154(b) by 0 days.

(21) Appl. No.: 11/110,313

(22) Filed: Apr. 20, 2005

(65) Prior Publication Data

US 2005/0236043 A1    Oct. 27, 2005

Related U.S. Application Data

(60) Provisional application No. 60/565,201, filed on Apr. 23, 2004.

(51) Int. Cl.
*G05D 7/00* (2006.01)

(52) U.S. Cl. .................. 137/240; 137/355.19; 137/377

(58) Field of Classification Search ................ 137/240, 137/355.16, 355.19, 272, 299, 301, 377; 285/8, 301
See application file for complete search history.

(56) References Cited

U.S. PATENT DOCUMENTS

| | | | | |
|---|---|---|---|---|
| 2,505,303 A | * | 4/1950 | Randa | 285/148.13 |
| 3,845,779 A | | 11/1974 | Greene | |
| 5,879,029 A | * | 3/1999 | Wilks | 285/8 |
| 6,561,810 B1 | * | 5/2003 | Schellhardt et al. | 434/126 |

* cited by examiner

*Primary Examiner*—Kevin Lee

(57) ABSTRACT

Compressed air is utilized for water evacuation from water hose or other liquid containing systems. A freeze-free water hose device is provided which includes an air pump-compressor means, a Y-coupling with a water faucet. In one case, there is utilized one Y-coupling with one shut-off valve and an air-compressor means in a water faucet vicinity or on a faucet's wall. In another case, there is utilized a Y-coupling at a water faucet with one shut-off valves and a Y-coupling with three shut-off valves at a water hose reel. Yet in another case, there are utilized two Y-couplings each with two shut-off valves: one Y-coupling at a faucet and another at a water hose reel. In this case, a compressed air means is assembled with a water hose reel. This device is utilized also in beer, soda and water industry for cleaning lines with chemicals or pure water.

3 Claims, 3 Drawing Sheets

FREEZE-FREE WATER HOSE

CROSS-REFERENCE TO RELATED APPLICATION

This application is related to, and claims priority from, our Provisional Appli-cation No. 60/565,201, filed on Apr. 23, 2004.

BACKGROUND OF THE INVENTION

Field of the Invention

This invention relates to evacuation of water from water hoses and faucets in the areas with sub-freezing temperatures providing freeze-free hoses and faucets and, in general, this invention relates to evacuation of liquids from liquid containing devices where it is necessary to evacuate liquids after their utilization.

It is known that all garden or other water hoses in the places with sub-freezing temperatures must be regularly disconnected and drained before the beginning of the freezing temperature time from a faucet coming out of a house or another place with a positive (non-freezing) temperature. When a water hose is not disconnected from a house faucet, water left in a hose and, especially, in a faucet connected to a hose can freeze and break a faucet or a hose. Another unpleasant feature is in the fact that water frozen in a hose prevents a normal water flow in a hose after subfreezing temperatures, therefore, it must be melted by either a warmer water flow or it is necessary to wait until day's warmer temperature will melt ice in a hose. Everybody knows how it is annoying to connect and disconnect water hoses regularly.

The problem of water freezing in water hoses and in faucets existed since water hoses had been invented. There have been attempts to keep water hoses and faucets from freezing by warming them with heating means such as applying electric current through surrounding wiring or metal tapes, by a water dripping through hoses and faucets, with thermal insulation. Unfortunately, all these methods are impractical and, in some cases, dangerous.

A fire hose attached to a faucet with left water also presents danger at subfreezing temperatures and has to be disconnected and water evacuated. There are other devices containing water or liquid that require regular disconnection from a faucet or similar device and evacuation of water or liquids. The reason can be in not only due to subfreezing temperatures but in the situations when water or liquid can be undesirable to keep for a certain period of time in a liquid containing device.

In the beverage dispensing industry—beer and soda and the water industry it is required to flush their lines, and clean with chemicals before refilling them with a product. There is a necessity to evacuate lines occupied with a residue of beer, soda or water.

The solution of this problem is in removing water from a water faucet and from a hose after finishing a water usage, or before the beginning of freezing temperatures, and removing water or liquid (beer, soda or others) from containing them devices. Our experiments show that water removal can be provided either by a water (liquid) suction from a hose and a faucet, or by a pressurized air with a pressure force applied to water (liquid) remained in a faucet and in a hose after closing a water faucet. An air pressure application to water (liquid) remained in a hose and in a faucet is energetically more efficient and practical than water (liquid) suction. Compressed air is preferable to be applied to a hose part near a water faucet, or to a specially designed place having an air adapter and also close to a water faucet so, water from a faucet will be evacuated at first.

The present invention relates to a special water (liquid) evacuation system comprising of an air adapter from an air pump-compressor into a water (liquid) faucet and a water (liquid) hose (line) that helps to remove water (liquid) from a hose (line) and a faucet.

In a prior art, an evacuation device for a garden hose is described in U.S. Pat. No. 3,845,779. The patent suggests utilization of air adapter similar to a conventional pneumatic tire valve type that includes a tubular air inlet valve stem. This type of air adapter has certain disadvantages such as it's quite complex structure that is a subject of corrosion from a faucet's water; such adapter is designed for air use, not water; it is not designed to have a contact with water inside of an air adapter.

SUMMARY OF THE INVENTION

It is therefore an object of the present invention is to utilize a simple, rigid and inexpensive means for preventing water from freezing in a water faucet and in a water hose without disconnection of a hose from a house faucet.

It is another object of the present invention is to provide a water evacuating system with a durable and reliable design that can prevent a water faucet and a water hose from freezing at sub-freezing temperatures without disconnection of a hose.

Still yet another object of the present invention is to provide the system: a water faucet—a water hose that will not freeze at low temperatures without disconnection of a water hose from a water faucet, and this system will be of a low manufacturing cost and easy available to public.

It is another object of the present invention is to provide a compressed air means applied from a portable air pump-compressor through an air adapter into a faucet valve, or into a water (liquid) hose (line), or a part adjusting to a faucet.

Yet another object of the present invention is to provide a compressed air to a hose part adjusting to a water hose reel, so a compressed air can be applied to this part and to a water faucet, and for convenience of a whole water hose reel usage and an air pump-compressor can be placed in a water hose reel attachment and be a part of a water hose assembly.

Another object of the present invention is to provide a locking device that is closed for water (liquid) and opened for air after water (liquid), which is a shut off valve.

Another object of the present invention is to provide a device that can be used with fire hoses and other similar devices, such as utilized in beer, soda and water industry, that necessary to evacuate from water or other liquids.

Yet another object of the present invention is to provide a whole device from existing standard made parts, so it will be easy to assemble and disassemble a water-liquid evacuation device and it will be inexpensive.

DESCRIPTION OF THE PREFERRED EMBODIMENTS

There are two extreme cases that should be considered for utilized garden water hose in sub-freezing temperatures, when a water hose can be placed without a reel on a ground, or left after the water hose usage on a reel:

a) water hose placed on a ground without a reel or on a reel and a water hose and a reel placement are lower than a water faucet valve height over a ground;

b) water hose with or without a reel placement is higher than a placement of a faucet valve height over a ground.

In the first case, water left in a hose will be of minimum volume because a part of it will be flown out under a gravity impact (a hose gun should be opened). Here, it is necessary to apply a relatively low air pressure to remove remains of water in a hose and in a faucet. In the second case, a water volume left in a hose will be of maximum volume and it is necessary to apply a certain pressure to remove water from a hose and a faucet. It is necessary to note that even in the first case, when water flows under a gravity force out of a hose, a water motion leads to a vacuuming effect in the area close to a faucet. A water surface tension force prevents complete evacuation of water that remains in a form of small droplets in a faucet and in areas adjacent to a faucet and in a hose. These droplets, if left, can cause especially substantial damage to a faucet during sub-freezing temperatures.

In the second, unfavorable case (when water hose and reel are placed higher than a water faucet), in order to remove water from a water hose and a faucet by air pressure it is necessary to apply air pressure $P_{air}$ that will be sufficient to overcome: a water friction resistance pressure $P_{fr}$, a pressure of remained water mass $P_{wm}$, and a hydrostatic pressure $P_{hyd}$, or $P_{air} > P_{fr} + P_{wm} + P_{hyd}$. A water friction, if water is not frozen, is quite low, and can be neglected. A water mass is 4 kg (in our experiments, typically left in a water hose of ⅝" diameter and 50 ft (about 15 m) long, after gardening) and a hydrostatic pressure can be taken equal to about 0.5 kg, if one can assume that a water hose is about 0.5 m high of a hose reel. It is known that 10 m of water column correspond to about 1 atm (or about 14 psi). In other words, in order to move water from a hose of 20 m long it is necessary to apply pressure just slightly over 0.5 atm (or about 7 psi). In practice, an opened water gun placed at the hose's end has a restricted opening producing additional resistance for water motion; thus it is necessary to apply a pressure slightly over 1.0 atm from the hose's other side to remove water remains.

Our experiments with hoses of different length and different pumps-compressors have shown that with a tight air adapter to a hose it is sufficient to utilize an air pump-compressor that can apply air pressure through air applicator just slightly over 1 atm (14 psi), because, in practice, most part of water is removed by its own flow under a gravity impact after closing a faucet. However, there is always remained water in a faucet and in a hose that had to be removed by a pressurized air. Despite low necessary pressure for removing water, regular air pumps-compressors of comparatively compact size, made available to consumers, do not work properly with a counter-pressure produced by a remained water in a hose. Most inexpensive conventional pumps-compressors provide air pressure over 100–150 psi and after water hose utilization a remained water from a ⅝" diameter (regularly used for houses) coiled hose of 50 ft (about 15 m) length is removed within 25 seconds, water from an uncoiled hose of the same length is removed in 15 seconds; and for a 100 ft (about 30 m) length water is removed from a coiled hose in about 1 minute 10 seconds, from an uncoiled hose water is removed in about 1 minute.

DESCRIPTION OF FIGURES

Features of present invention which believed to be patentable are set forth with particularities in the appended claims. The organization and manner of operation of the invention together with further objectives and advantages thereof, may be understood by reference to the following descriptions of specific embodiments thereof taken in connection with accompanying drawings in which like reference numerals identify like elements. Such description makes reference to the figures of which:

Referring to FIG. 1 there is shown a prior-art garden hose evacuating device with a water faucet 11 that connected with a garden hose 12. Between a water faucet and a garden hose there is a connecting assembly 10 and an air adapter 14. An air adapter 14 is made of a conventional pneumatic tire valve type adapter. Air from compressor can be applied to an air adapter 14 in a way that it works with regular car or bicycle tire. After garden hose utilization a faucet is closed and a compressed air through an air adapter 14 is applied to a hose to evacuate remained water from a garden hose.

A shortcoming of this device is evident especially when a garden hose is placed higher than a water hose. In this case, remained water may not be completely pressed out of volume between an adapter 14 and a faucet 11. Then even a small amount of remained water can damage a water faucet. Compressed air, in this case, is not applied through a water faucet.

Figure 1:
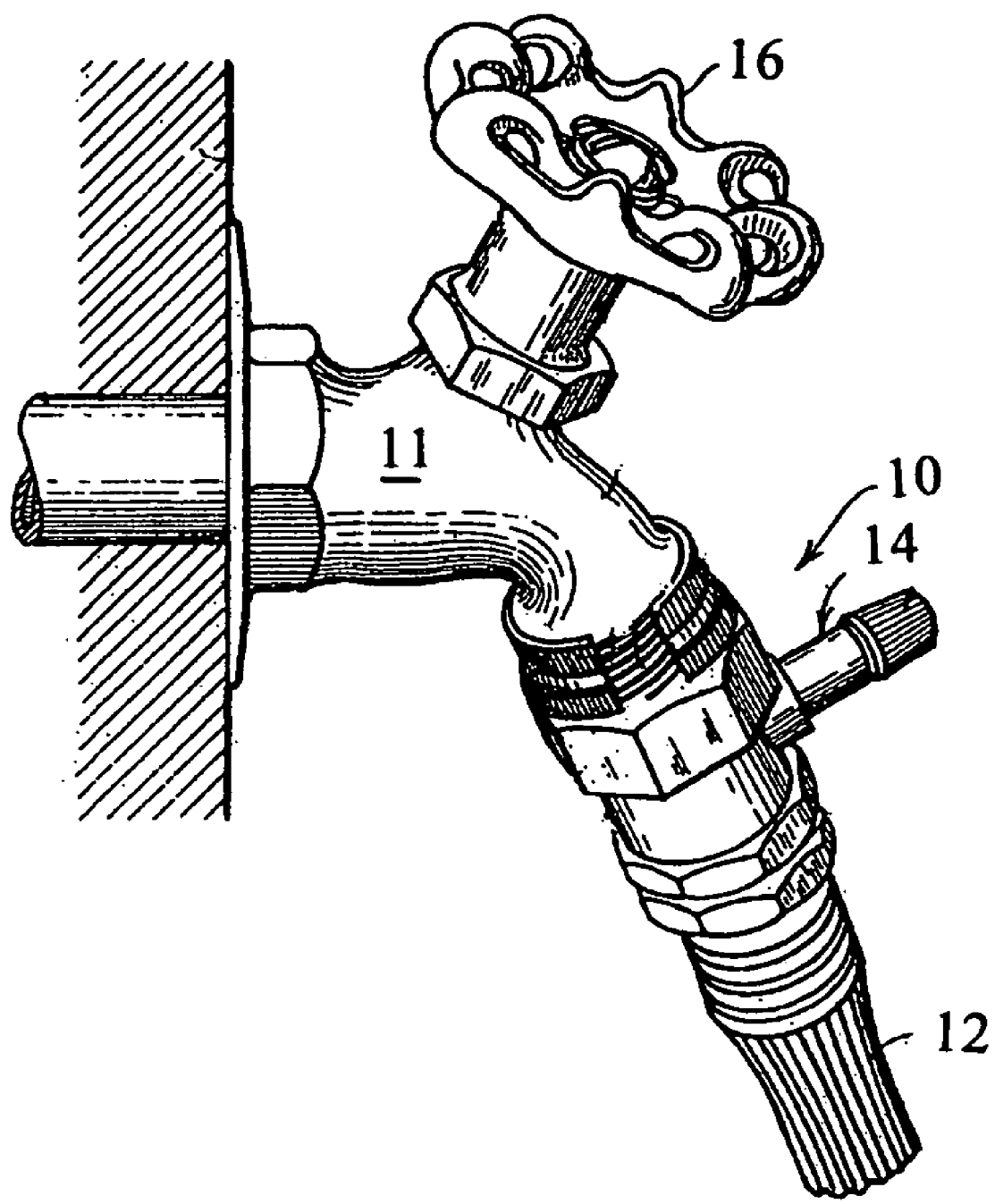
FIG. 1 is a prior-art garden hose with a pneumatic tire valve with air used for evacuation of water from a garden hose: U.S. Pat. No. 3,845,779.
Figure 2:
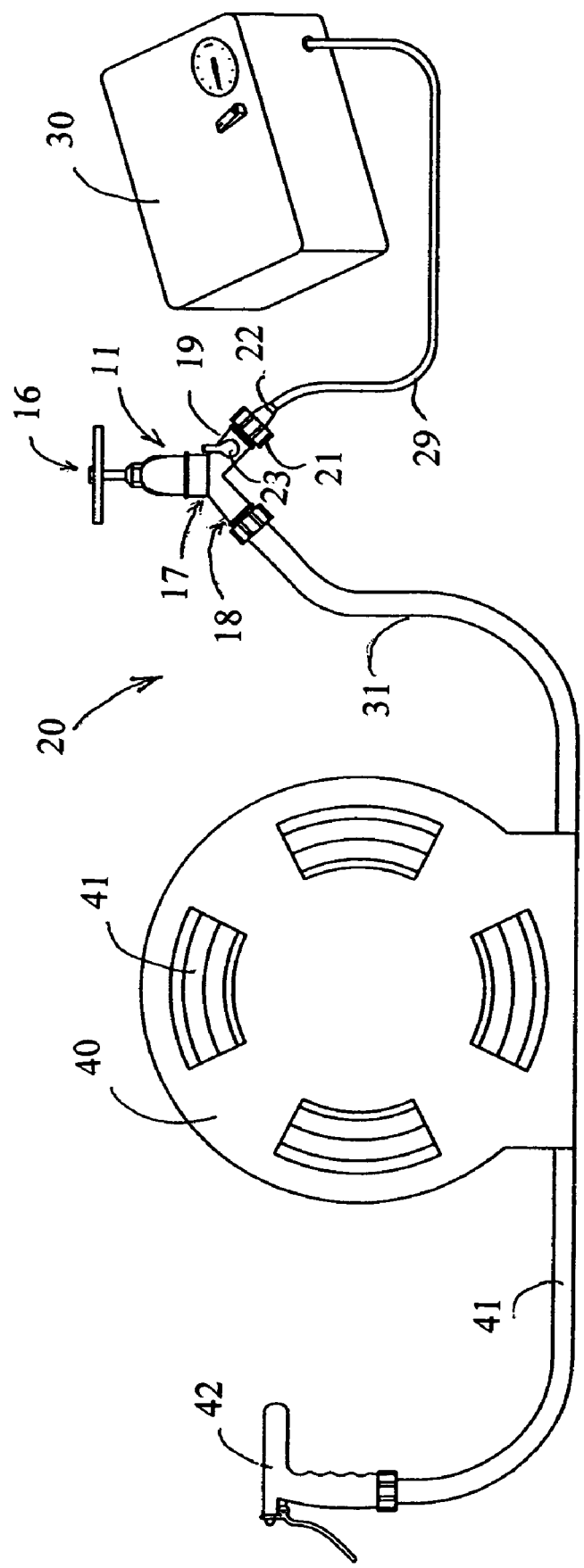
FIG. 2 is a general schematic diagram of present invention of a water hose with a faucet with a Y-coupling, an air pressure adapter and a compressor in area adjacent to a faucet (1–2 feet from a water faucet).

FIG. 2 illustrates a typical water hose assembly 20 of the present invention. It comprises of a water faucet 11 with a rotary knob 16, a Y-coupling 17 with two outlets: left outlet 18 and a right outlet 19 closed with an attachment part 21 that has an air adapter 22 that easy to connect to air pump-compressor 30. In this case, a Y-coupling 17 has one shut-off valve 23 from a right outlet 19. In order to admit air pressure from an air connecting tube 29 into a Y-coupling 17 there is a shut-off valve 23 that controls water/air and opens and closes a passage for air applied from an air pump-compressor into an air adapter 22. Also, in this arrangement, an air pump-compressor 30 is convenient to place on a wall near a water faucet as shown in FIG. 2. In the case of utilization of this device with a beer, soda or water lines, that necessary to be evacuated and cleaned with chemicals, an air adapter 22 can be substituted with a connecting valve (not shown in FIG. 2).

In the case of utilization of a reeled hose (FIG. 2), water is evacuated as follows. During water utilization a shut-off valve 23 is closed, so water from a faucet 11 can travel through a left outlet 18 of a Y-coupling 17 only into a leader hose 31, that usually reeled hoses have, and further into a main hose 41 of a reel 40. After utilization of a hose, a faucet 11 is closed by a rotary knob 16. A hose's gun 42 at the hose's end is opened. A shut-off valve 23 is opened and compressed air is applied through an air adapter 22 into a right outlet 19 into a faucet's cavity 11, into a left outlet 18 of a Y-coupling 17 into a leader water hose 31, into a main hose 41 of a reel 40, and through an opened hose's gun 42 outside.

Figure 3:
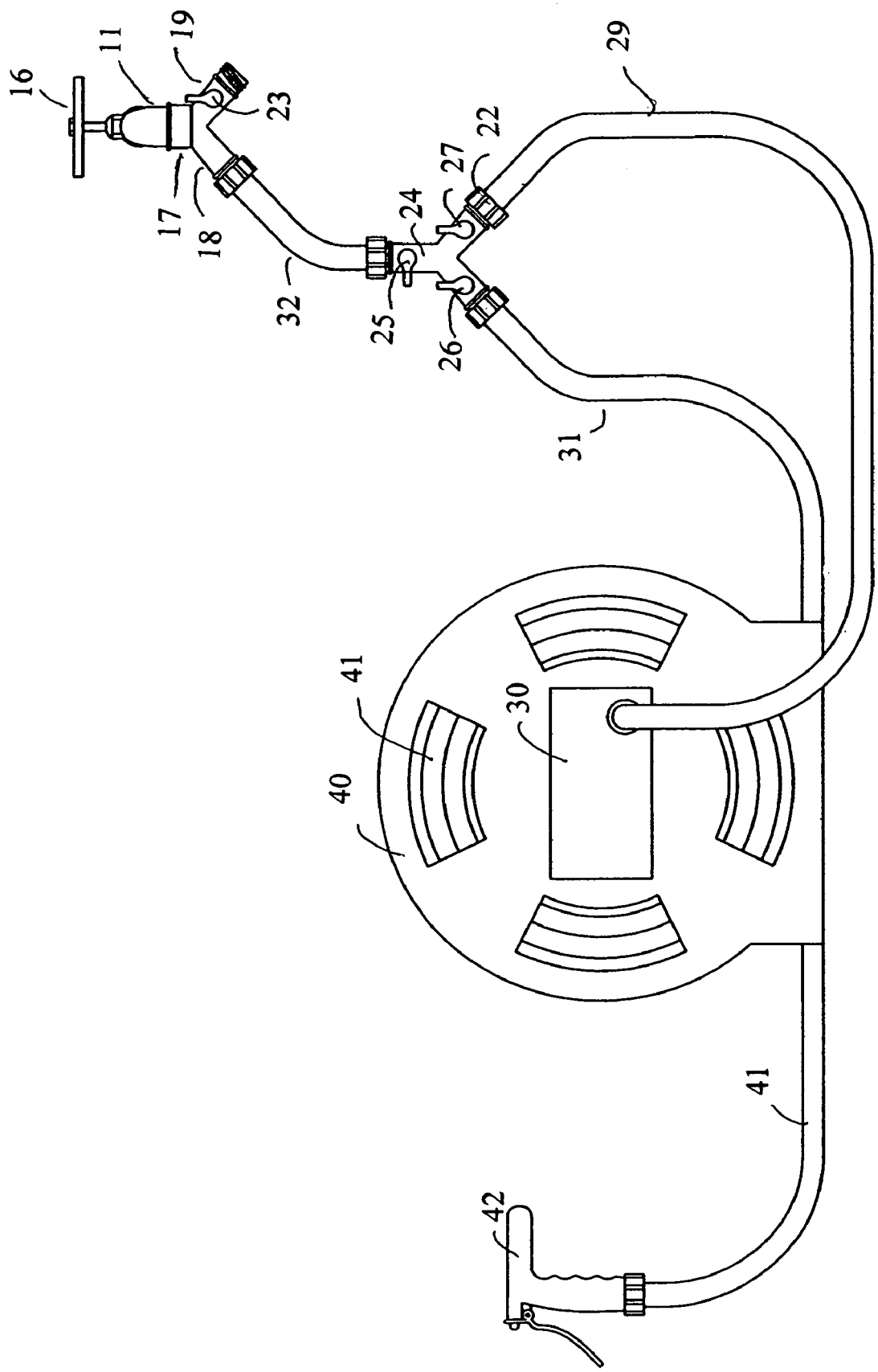
FIG. 3 is a schematic diagram of present invention of a water hose with a faucet with a Y-coupling, and in the area adjacent to a hose reel (assembled with a hose reel) with a Y-coupling, an air pressure adapter and a compressor.

FIG. 3 illustrates a typical arrangement for a hose and a faucet when an air adapter is placed close to a water hose reel so an air pump-compressor 30 can be assembled with a water hose reel 40. In this case, it is utilized a Y-coupling 17 at a faucet with one shut-off valve 23 and a Y-coupling 24 with three shut-off valves 25, 26. 27 adjacent to water hoses 32,31 and 29. A shut-off valve 25 that opens and closes water flow into a leader water hose 31 into a reel 40 through a shut-off valve 26 that opens and closes water flow coming into a leader water hose 31 from a water faucet 11, a shut-off valve 27 that opens and closes air coming from an air pump-compressor 30 through a connector hose 29 and through an air adapter 22.

In this case, during a water hose operation a Y-coupling 17 connected to a faucet 11 has no air adapter, air simply flows through an air connecting short hose 29 with a shut-off valve 23 opened for compressed air. When water flows through a water hose a shut-off valve 27 is closed, shut-off valves 25 and 26 are opened, and a shut-off valve 23 is closed. A Y-coupling 24 through a connector hose 29 with an air adapter 22 is connected to an air pump-compressor 30. Air compressor 30 can be installed into a water resistant box (not shown).

Water is evacuated in two steps. A first one, after a hose operation and closing a faucet 11, shut-off valves 23,27 and 25 are opened, and a shut-off valve 26 is closed. Air applied through an air adapter 22 presses water out of a connector water hose 29, out of a connector hose 32 (it is possible to have a Y-coupling 24 connected to a Y-coupling 17 and have both Y-couplings with two shut-off valves; in this case, it is not necessary to use a connector hose 32), a faucet's cavity 11 and a Y-coupling 17 through its right outlet 19 outside.

A second step. After evacuation of water from connector hoses 29 and 32, from a faucet's cavity 11 and Y-couplings 24 and 17, a shut-off valve 26 is opened and a shut-off valve 25 is closed. Air is applied through an adapter 22 into a Y-coupling 24 through opened shut-off valves 27 and 26 into a leader water hose 31, into a main hose 41 of a reel 40 through a hose's gun 42 outside. A Y-coupling 24 can be placed either outside a water faucet 11, or in a water hose reel body 40.

We claim:

1. A freeze-free water hose device comprising:
   a water faucet connected through a Y-coupling with two-way exits has one shut-off valve;
   one of said Y-coupling exits is connected to a leader water hose that is a short part of a water hose reel;
   a second part of said Y-coupling with a shut-off valve has opening for removal of water and air;
   an air pump-compressor is assembled with the water hose reel;
   after operation of a water hose and after closing the faucet with a compressed air is applied into said water hose reel through said Y-coupling having one shut-off valves;
   for water evacuation, a shut-off valve of said Y-coupling is opened between an air adapter and a water hose.

2. A freeze-free water hose device comprising:
   a water faucet connected to a water hose through a Y-coupling with two-way exits and with one shut-off valves;
   one of said Y-coupling exits is connected through a short water hose to a second Y-coupling with three shut-off valves to a leader water hose that is a short part of a water hose reel;
   a second two-way exit of the first Y-coupling with the shut-off valve has opening for removal of water and air;
   an air pump-compressor is assembled with said water hose reel;
   after utilization of the water hose reel with opened shut-off valves from the water faucet and a water hose sides a compressed air is applied into a water hose reel through the second Y-coupling having three shut-off valves;
   for water evacuation, in a first step, shut-off valves of the second Y-coupling at the water hose reel are opened between an air adapter and a main water hose, and a compressed air is applied into the water hose reel for a removal of a water residue;
   for water evacuation, in a second step, a shut-off valve of the second Y-coupling to a water hose reel side is closed, and shut-off valves to a water faucet side of both said Y-couplings are opened and water is evacuated through a second outlet of the first Y-coupling adjacent to a water faucet through an opened shut-off valve.

3. A freeze-free water hose comprising:
   a Y-coupling with one shut-off valve at a water faucet and a Y-coupling with three shut-off valves between a water hose reel, the water faucet and an air pump-compressor, said air pump-compressor assembled with the water hose reel in a water hose reel compartment, in a water-resistant box for protection from water and other weather impacts on the air compressor.

* * * * *